United States Patent Office 2,821,315
Patented Jan. 28, 1958

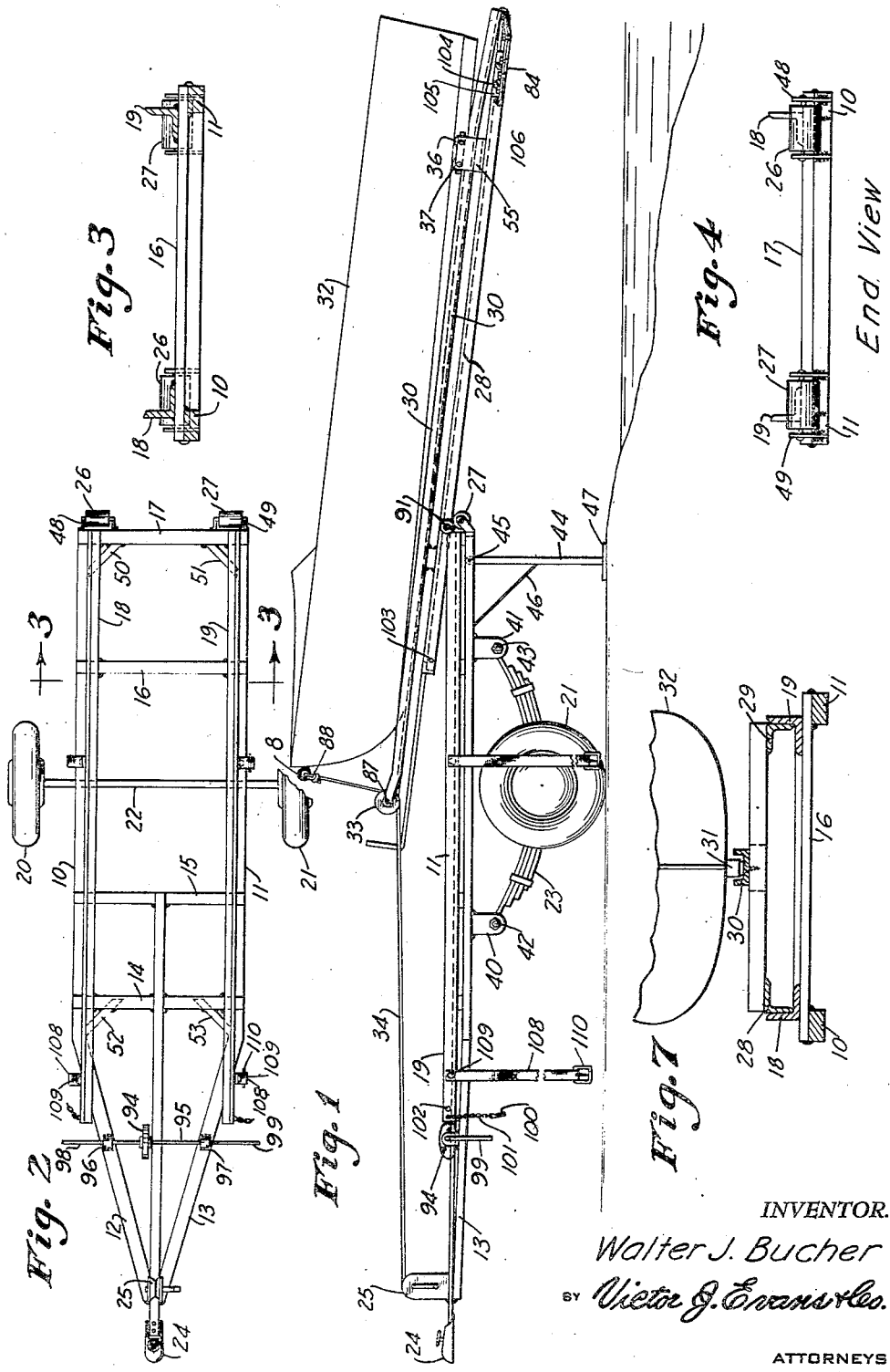

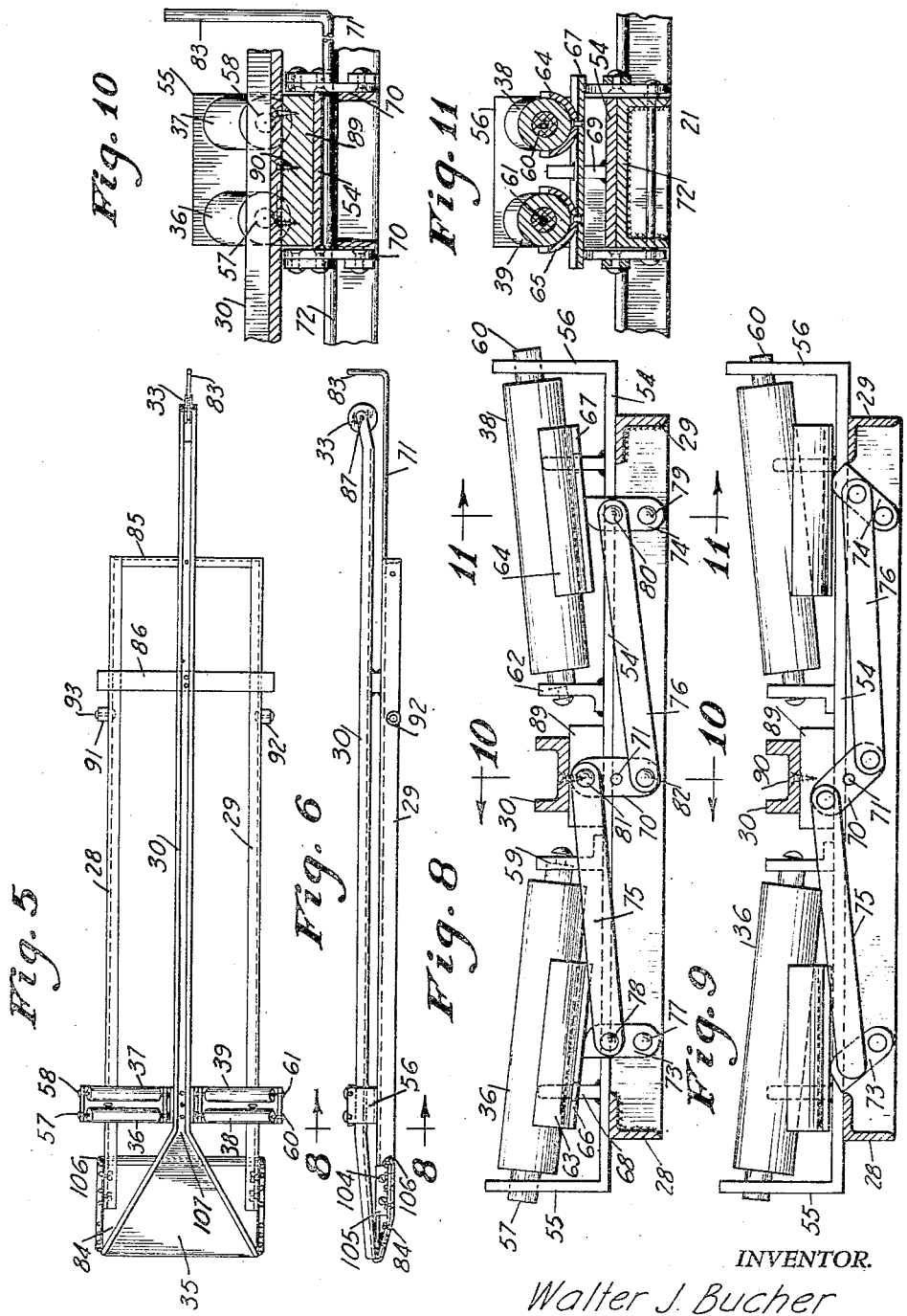

2,821,315

ONE MAN BOAT TRAILER

Walter J. Bucher, Paterson, N. J.

Application March 6, 1956, Serial No. 569,773

3 Claims. (Cl. 214—505)

This invention relates to boat carrying trailers of the type adapted to be connected to rear bumpers of motor vehicles with a conventional hitch, and in particular a trailer having a telescoping frame with rollers at the end of a base frame upon which the telescoping frame travels and in which the telescoping frame is provided with rollers covered with resilient material and having braking means therefor, and is adapted to be drawn upon the base of the trailer with a winch and cable combination.

The purpose of this invention is to provide a boat trailer upon which a boat may readily be drawn with a winch and cable and from which the boat may readily be launched by overbalancing a telescoping section or frame to deposit a boat positioned thereon in the water.

Various types of two wheel trailers have been provided for carrying boats from a residence to the water and from the water to the residence, however, with the conventional trailer it is difficult to elevate the boat to the carrying element of the trailer and it is also difficult to launch the boat without damaging the hull. With this thought in mind this invention contemplates a trailer having a base frame with an auxiliary or telescoping frame slidably mounted therein, with boat carrying elements positioned on the telescoping frame and with manually actuated power means for drawing a boat from the water upon the telescoping frame and also for drawing the telescoping frame to a carrying position upon the base frame.

The object of this invention is, therefore, to provide means for forming a boat trailer whereby a boat is readily positioned upon a telescoping frame and wherein the telescoping frame is readily drawn to a traveling position upon a base frame of the trailer.

Another object of the invention is to provide a boat trailer with which a boat may readily be recovered from the water without running the wheels, axle and springs of the trailer into the water.

A further object of the invention is to provide an improved boat trailer which is of a simple and economical construction.

With these and other objects and advantages in view the invention embodies a trailer including a base frame mounted on wheels and having collapsible supporting means on a trailing end and a hitch and a winch on the leading end, a telescoping boat carrying upper frame slidably mounted on the base frame and having boat engaging rubber covered rollers spaced inwardly from the trailing end and a cable receiving roller on the leading end with a cable extended from the winch, trained over the cable receiving roller or pulley and adapted to be connected to the bow of a boat positioned on the telescoping frame.

Other features and advantages of the invention will appear from the following description taken in connection with the drawings, wherein:

Figure 1 is a side elevational view showing a boat mounted on the telescoping frame with the telescoping frame extended from the end of the base frame and retained in position by a cable extended from the winch of the base frame.

Figure 2 is a plan view of the base frame with the upper or telescoping frame omitted.

Figure 3 is a cross section through the base frame taken on line 3—3 of Fig. 2 showing the parts on an enlarged scale.

Figure 4 is an end elevational view of the base frame with the collapsible supporting means omitted.

Figure 5 is a plan view of the upper or telescoping frame with the base frame and other parts omitted.

Figure 6 is a side elevational view of the upper frame, shown in Fig. 5.

Figure 7 is a typical cross section through the trailer showing the keel of a boat nested in a channel in the center of the telescoping frame and showing angle bars at the sides of the telescoping frame nested in angle bars of the base frame.

Figure 8 is a cross section through the trailing portion of the upper frame taken on line 8—8 of Fig. 6 with the parts shown on an enlarged scale and illustrating the mounting of the rollers covered with resilient material and also the braking elements which are shown in the positions of retaining the rollers stationary.

Figure 9 is a cross section similar to that shown in Fig. 8 showing the braking elements in released positions.

Figure 10 is a longitudinal section, also with the parts shown on an enlarged scale, taken on line 10—10 of Fig. 8 showing the mounting of the boat keel receiving channel on the upper telescoping frame, the section being taken on line 10—10 of Fig. 8.

Figure 11 is a section similar to that shown in Fig. 10 taken on line 11—11 of Fig. 8 also showing the rollers having sleeves of resilient material on outer surfaces thereof.

Referring now to the drawings wherein like reference characters denote corresponding parts the improved boat trailer of this invention includes a base frame having side bars 10 and 11 with converging forward ends 12 and 13 and connected with cross bars 14, 15, 16 and 17, spaced parallel rails 18 and 19, L-shaped in cross section, mounted on the cross bars, wheels 20 and 21 positioned on the ends of an axle 22 connected to the frame with springs 23, a hitch 24 positioned on the forward end of the frame, a winch 25 also positioned on the forward end of the frame and rollers 26 and 27 extended from the trailing end of the frame, an upper frame having side bars 28 and 29, L-shaped in cross section adapted to be nested in the rails 18 and 19 and positioned to travel on the rollers 26 and 27, a center channel bar 30 in which a keel 31 of a boat 32 may be nested, a pulley 33 over which a cable 34 extended from the winch 25 is trained, an apron 35 opening into the channel 30 and rollers 36 and 37 on one side and 38 and 39 on the opposite side, the rollers being positioned to receive the hull of a boat, as shown in Fig. 1.

The springs 23 of the wheels 20 and 21 are secured to the side bars of the base frame with yokes 40 and 41 to which the ends of the upper leaves of the springs are connected with pins 42 and 43 and the trailing ends of the side bars are supported with struts 44 which are pivotally connected to the side bars 10 and 11 with pins 45 and which are supported in vertically disposed positions with braces 46. The lower ends of the struts are provided with base plates 47.

The rollers 26 and 27, which are preferably made of bronze or other non-corrosive material are freely rotatable, being mounted in brackets 48 and 49, respectively. The corners of the base frame are reinforced with diagonal braces 50 and 51 at the rear and 52 and 53 at the opposite or leading end.

In traveling the hitch 24 is adapted to be connected to a ball or the like on the rear bumper of a motor vehicle and the struts 44 folded against under surfaces of the side bars 10 and 11.

The boat contacting rubber covered rollers are mounted in a bracket having a base plate 54 with end plates 55 and 56 and, as shown in Fig. 8 the rollers are rotatably mounted with shafts 57 and 58 of the rollers 36 and 37 rotatably mounted in the plate 55 and in an inner bearing 59 and the rollers 38 and 39 by shafts 60 and 61 in the plate 56 and in an inner bearing 62.

The rollers, which are provided with outer sleeves of rubber or other suitable resilient material are positioned to be engaged with brake shoes with shoes 63 positioned to contact the rollers 36 and 37 and with similar shoes 64 and 65 positioned to contact the rollers 38 and 39.

The brake shoes 63 are mounted on a plate 66 and the shoes 64 and 65 on a similar plate 67. The plate 66 is located by a pin 68 which extends upwardly through an opening therein and the plate 67 is located by a similar pin 69.

The brake shoes are actuated to holding and released positions by toggle levers 70 mounted on a longitudinally disposed shaft 71 and the levers 70 which are pivotally mounted on opposite sides of a channel-shaped member 72 are connected to cams 73, that coact with the plates 66 and 74, that coact with the plate 67, with links 75 and 76, respectively, the links and levers and also the cams on opposite sides of the member 72 being similar.

The cams 73 are pivotally mounted on a pin 77 and pivotally connected to the link 75 with pins 78 and the cams 74 are pivotally mounted on a shaft 79 and pivotally connected to the link 76 with pins 80. The inner ends of the links 75 are pivotally connected to the levers 70 with pins 81 and the inner ends of the links 76 are pivotally connected to the lower ends of the levers 70 with pins 82. By this means the cams are manually actuated by a handle 83 through the shaft 71 to urge the brake shoes into gripping relation with the rollers and also to release the shoes from the rollers, dropping the brake shoes to the positions shown in Figure 9.

The side rails 28 and 29, of the upper frame are connected at one end with the apron 35, the lower end 84 of which folds under the lower edges of the bars and the opposite ends are connected with a cross bar 85 and also with a bar 86 upon which the center channel 30 is positioned.

The pulley 33 over which the cable 34 from the winch 25 is trained is rotatably mounted by a pin 87 in the end of the channel 30 and the end of the cable is provided with a clevis 88 by which the cable may be attached to an eye 8 on the bow of the boat 32.

The channel 30 is secured to the base 54 of the bracket in which the rollers are mounted with a block 89 to which the channel is connected with screws 90, as shown in Fig. 10.

The side bars 28 and 29 of the upper frame are provided with rollers 91 and 92 which are rotatably mounted with pins 93 and these rollers are positioned to travel on the rails 18 and 19 of the lower frame to facilitate sliding the upper frame longitudinally of the lower frame in launching a boat and also in loading a boat upon the trailer. The rollers 91 and 92 are also positioned to engage the bronze rollers 26 and 27 to limit outward movement of the upper frame, providing a safety lock and preventing the upper frame rolling or sliding from the trailing end of the lower frame.

Additional locking means is provided with a cam 94 carried by a shaft 95 rotatably mounted in bearings 96 and 97 and adapted to be actuated by handles 98 and 99 at the ends of the shaft. The cam 94 is adapted to push the upper frame on the bronze rollers and safety locking rollers 91 and 92 and also prevents the upper frame traveling too far forward. By this means the operation of the device is facilitated so that boats may be loaded and launched by women or a handicapped individual.

The upper frame is also adapted to be locked on the lower frame with pins 100 carried by chains 101 and adapted to be inserted through openings 102 in the rails 18 and 19 of the lower frame and also in openings 103 in the leading ends of the side bars 28 and 29 of the upper frame.

The lower end 84 of the apron 35 extends under the trailing end of the upper frame and the end 84 is secured to the frame with screws 104 which are positioned in openings of flanges 105 at the sides of the apron. The apron is formed with a continuous plate which extends from the point 106 to the vertex 107 of the triangular shaped upper portion of the apron.

The lower frame is also provided with straps 108 which are attached to the rails 18 and 19 with pins 109 the extended ends of the straps being provided with buckles 110 by which the straps may be fastened over a boat or the like.

The cam 94 is particularly adapted for carrying large and comparatively heavy boats and also provides safety means for retaining boats in position upon the device.

In operation the trailer is backed to the edge of the water, the struts 44 positioned, as illustrated in Fig. 1, and the upper or telescoping frame moved to an extended position, also as illustrated in Fig. 1 wherein the extended end overbalances the weight of the frame so that a boat, as indicated by the numeral 32 may be positioned on the rollers 36 and 37 in one side and 38 and 39 at the opposite side and with the keel in the channel 30. The clevis 88 of the cable 34 is then secured to the eye 8 or to other fastening elements on the bow of the boat and by turning the winch with a handle 91 the boat may be drawn upon the upper frame and the upper frame with the boat thereon drawn inwardly to a position on the lower or base frame with the stern of the boat slightly extended and with the boat and upper frame in such positions the boat and upper frame are secured to the base frame so that the boat may be carried from one position to another without danger of the boat sliding from the trailer. In drawing the boat and upper frame inwardly the upper frame travels on the rollers 26 and 27 and the boat rests upon the rollers 36, 37, 38 and 39.

The boat is adapted to be launched by releasing the cable and drawing the upper or telescoping frame rearwardly, until the extended end overbalances the forward end causing the boat to drop into the water, and with the end 84 of the apron dropping upon the ground or bed of a river or lake.

It will be understood, that modifications, within the scope of the appended claims, may be made in the design and arrangement of the parts without departing from the spirit of the invention.

What is claimed is:

1. In a boat trailer, the combination which comprises a horizontally disposed frame having side bars connected with cross bars and having wheels carried by an axle depending from the side bars, said frame also having a hitch on the forward end, rollers rotatably mounted on the trailing end of the frame and extended upwardly therefrom, spaced parallel rails, L-shaped in cross section mounted on the cross bars of the frame and aligned with said rollers, an upper frame also having side rails, L-shaped in cross section, mounted in an inverted position and positioned to nest in the spaced parallel rails of the frame, said side rails of the upper frame being positioned to travel over the rollers, a plate connecting the rails of the upper frame at one end thereof, a bar connecting said rails of the upper frame at the opposite end thereof, a keel receiving channel bar mounted on the plate and bar and extended forwardly of the upper frame, said channel bar being positioned longitudinally of the upper frame and being on the longitudinal center thereof, a plate mounted on the under surface of the trailing ends of the side rails of the upper frame, extended rearwardly from said rails and bent upon itself and having a triangular-shaped portion extended over the end portion of the upper frame, said triangular-shaped portion of the plate leading into the channel bar of the upper frame, and pairs of transversely positioned rollers mounted on the plate connecting the side rails of the upper frame, the rollers being mounted in inclined positions providing supporting means for a boat on the upper frame and positioned with the keel in said channel bar.

2. In a boat trailer, the combination which comprises a horizontally disposed frame having side bars connected with cross bars and having wheels carried by an axle depending from the side bars, said frame also having a hitch on the forward end, rollers rotatably mounted on the trailing end of the frame and extended upwardly therefrom, spaced parallel rails, L-shaped in cross section mounted on the cross bars of the frame and aligned with said rollers, an upper frame also having side rails, L-shaped in cross section, mounted in an inverted position and positioned to nest in the spaced parallel rails of the frame, said side rails of the upper frame being positioned to travel over the rollers, a plate connecting the rails of the upper frame at one end thereof, a bar connecting said rails of the upper frame at the opposite end thereof, a keel receiving channel bar mounted on the plate and bar and extended forwardly of the upper frame, said channel bar being positioned longitudinally of the upper frame and being on the longitudinal center thereof, a plate mounted on the under surface of the trailing ends of the side rails of the upper frame, extended rearwardly from said rails and bent upon itself and having a triangular-shaped portion extended over the end portion of the upper frame, said triangular-shaped portion of the plate leading into the channel bar of the upper frame, pairs of transversely positioned rollers mounted on the plate connecting the side rails of the upper frame, the rollers being mounted in inclined positions providing supporting means for a boat on the upper frame and positioned with the keel in said channel bar, toggle acting levers mounted on the upper frame and having brake shoes positioned to grip the rollers to prevent rotation thereof, a rod extended from the toggle acting levers to the forward end of the channel bar, and a handle on the extended end of the rod for rotating the rod to apply and release the brakes of the rollers.

3. In a boat trailer, the combination which comprises a horizontally disposed frame having side bars connected with cross bars and having wheels carried by an axle depending from the side bars, said frame also having a hitch on the forward end, rollers rotatably mounted on the trailing end of the frame and extended upwardly therefrom, spaced parallel rails, L-shaped in cross section mounted on the cross bars of the frame and aligned with said rollers, an upper frame also having side rails, L-shaped in cross section, mounted in an inverted position and positioned to nest in the spaced parallel rails of the frame, said side rails of the upper frame being positioned to travel over the rollers, a plate connecting the rails of the upper frame at one end thereof, a bar connecting said rails of the upper frame at the opposite end thereof, a keel receiving channel bar mounted on the plate and bar and extended forwardly of the upper frame, said channel bar being positioned longitudinally of the upper frame and being on the longitudinal center thereof, a plate mounted on the under surface of the trailing ends of the side rails of the upper frame, extended rearwardly from said rails and bent upon itself and having a triangular-shaped portion extended over the end portion of the upper frame, said triangular-shaped portion of the plate leading into the channel bar of the upper frame, pairs of transversely positioned rollers mounted on the plate connecting the side rails of the upper frame, the rollers being mounted in inclined positions providing supporting means for a boat on the upper frame and positioned with the keel in said channel bar, toggle acting levers mounted on the upper frame and having brake shoes positioned to grip the rollers to prevent rotation thereof, a rod extended from the toggle acting levers to the forward end of the channel bar, a handle on the extended end of the rod for rotating the rod to apply and release the brakes of the rollers, a winch mounted on the leading end of the horizontally disposed frame with a cable extended from the winch over a pulley mounted on the leading end of the upper frame and to a point for attachment to the bow of a boat on the upper frame, and adjustable supports depending from the horizontally disposed frame for retaining the frame in a horizontal position.

References Cited in the file of this patent

UNITED STATES PATENTS

| | | |
|---|---|---|
| 1,017,749 | Gunther | Feb. 20, 1912 |
| 2,389,338 | Zorc | Nov. 20, 1945 |
| 2,485,793 | Vassar | Oct. 25, 1949 |
| 2,557,203 | Rehberger | June 19, 1951 |
| 2,676,716 | Sallis | Apr. 27, 1954 |
| 2,700,480 | Triplett | Jan. 25, 1955 |
| 2,711,259 | Jones | June 21, 1955 |
| 2,750,058 | Burch | June 12, 1956 |
| 2,754,987 | Kern | July 17, 1956 |

FOREIGN PATENTS

| | | |
|---|---|---|
| 496,549 | Great Britain | Nov. 28, 1938 |